Figure 1:
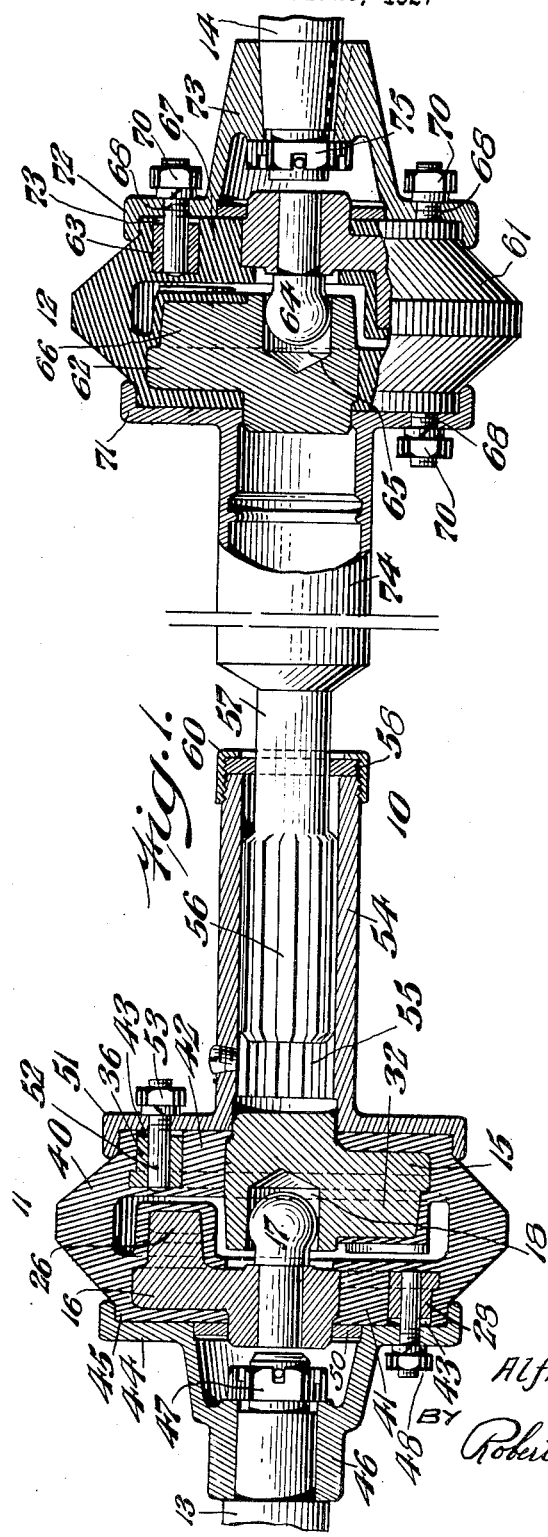

Jan. 24, 1928.

A. WEILAND 1,657,291

UNIVERSAL JOINT

Filed Jan. 20, 1927

2 Sheets-Sheet 1

Inventor
Alfred Weiland,
BY Robert M. Barr.
Attorney

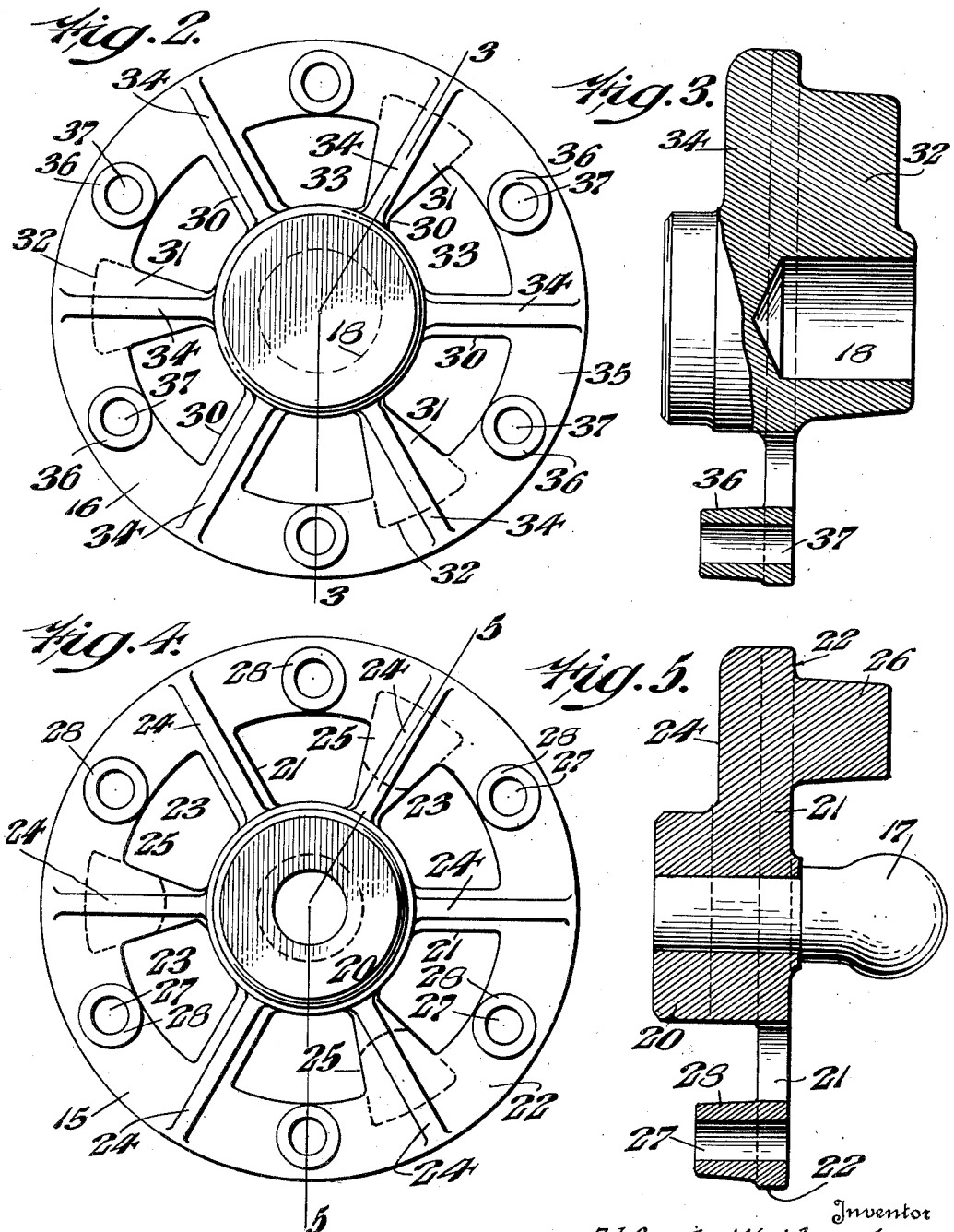

Patented Jan. 24, 1928.

1,657,291

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

UNIVERSAL JOINT.

Application filed January 20, 1927. Serial No. 162,314.

The present invention relates to flexible couplings and more particularly to one of the universal joint type.

Some of the objects of the present invention are to provide an improved universal joint and flexible coupling; to provide an efficient coupling construction whereby any variation of the distance between the driven element and the driving element when operating is automatically compensated; to provide a flexible coupling construction wherein torque resistance factors are ample to meet maximum torque to which the coupling will be subjected; to provide a universal joint construction formed of metal and rubber or rubberized fabric wherein the two materials of different characteristics are so bonded together as to resist separation and breakage; to provide an improved molded and metal reinforced universal joint; to provide means for subjecting the resilient body of a combined rubber and metal universal joint to compression during assembly whereby in its finished state it is compressed a desired amount; and to provide other improvements as will hereinafter appear.

In the accompanying drawings Fig. 1 represents a side elevation, broken away in part, of a universal or flexible coupling embodying one form of the present invention; Fig. 2 represents an end elevation of one of the insert plates for the jointed coupling unit; Fig. 3 represents a section on line 3—3 of Fig. 2; Fig. 4 represents an end elevation of a second insert plate for the jointed coupling unit; and Fig. 5 represents a section on line 5—5 of Fig. 4.

Referring to the drawings, and more particularly Fig. 1 thereof, the form of the present invention, here illustrated by way of example, comprises a flexible coupling 10 made up of two units 11 and 12 and interposed as a connecting means between a driving shaft 13 and a driven shaft 14 to transmit power from one shaft to the other with allowance for alignment and automatic compensation for variation of the distance between the aforesaid shafts.

For universal joint action the unit 11 of the coupling 10 consists of two metal plates or inserts 15 and 16 arranged side by side in spaced axial alignment, one having a projecting ball joint member 17 fixed thereto and seating within a socket 18 of the other.

The insert 15 is generally of spider construction having a hub 20 joined by radial webs 21 to a circumferential flange 22 whereby a plurality of through holes 23 are formed for a purpose to be presently described. All of the webs 21 are reinforced at the outer side of the insert 15 by radially disposed ribs 24 which function also as thrust abutments as will be explained. Alternate webs, as here shown, increase in thickness from the hub part 20 to the flange 22 and thus provide substantial bases 25 for respectively strengthening outstanding lugs 26 formed upon the inner side of the insert opposite the corresponding webs 21 of increased size.

For clamping certain parts to the insert 15, the flange 22 is provided with a plurality of bolt holes 27, bounded in each instance by a boss 28 formed upon and projecting from the flange 22 between the ribs 24. These bosses 28 serve as torque reinforcements for the outwardly disposed side of the insert 15.

The insert 16 is preferably similar in construction to the insert 15, except for the socket 18 which is to receive the joint ball member 17, and hence may be generally described by saying it has radial webs 30, alternate ones of which are increased in thickness to form bases 31 for outstanding lugs 32. The webs 30 provide through holes 33 and are reinforced by ribs 34 serving the same purpose as the ribs 24 heretofore described. Also the flange 35 is provided with bosses 36 and bolt holes 37 for attachment to the end plate and to provide the desired end clearance.

The assembling of the inserts 15 and 16 takes place by molding them into a resilient, flexible, hollow casing 40 of rubber or rubberized fabric, in face to face spaced relation so that the two inserts are embedded in the resilient material except for the ball member 17 and socket 18 which are exposed to provide the desired interfitting of these parts. In connection with the molding in of the inserts 15 and 16 it should be noted that it is desirable to maintain the casing material somewhat compressed and to provide for this the end walls 41 and 42 are relatively thick, this thickness being greater than the length of the corresponding boss 28 or boss 36. Hence in the molding operation the clearances 43 at the respective ends of the bosses 28 and 36 are temporarily filled with some removable device, such for instance as washers, which, after the molding is completed, can be taken out to leave the desired clearances.

For clamping one end of the unit 11 to the driving shaft 13, a flanged cap plate 44 of annular form is seated over the shouldered end 45 of the casing 40 and is formed integral with a hub 46 which receives the end of the shaft 13 and is clamped thereon by a nut 47. Stud bolts 48 which have been made fast in the bolt holes 27 project through the plate 44 and not only clamp the parts firmly together but maintain the end wall compressed. A spacing collar 50 fits snugly about the hub 20 and maintains a centered relation by co-action with the opening in the plate 44.

The opposite end of the unit 11 is likewise mounted in a flanged cap plate 51 which is clamped tight and maintains compression of the material by stud bolts 52 fast in the holes 37 and projecting through the plate 51 to be engaged by the nuts 53. This plate 51 is formed with a tubular extension 54 having internal longitudinally arranged grooves 55 to receive the fluted end 56 of a coupling bar 57. The open end of the extension 54 is closed by a packing ring 58 and compression cap 60 in order that lubricant contained within the extension may not escape.

The unit 12 functions at the driven end of the coupling to permit universal movement and is of like construction to the unit 11. For this reason it is believed unnecessary to specifically describe all of its parts and therefore it will only be generally referred to. The casing 61 of this unit is molded about two centering inserts 62 and 63, which respectively support the ball member 64 and the socket member 65 and have molded-in interfitting lugs 66 spaced circumferentially for engagement under maximum torque. The resistance of the inserts to torque strain is made effective by the lugs 67 of rubber molded into the holes of the inserts. The inserts also serve as mountings for stud bolts 68 which project from opposite sides of the casing 61 and respectively serve with the nuts 70 to clamp flanged cap plates 71 and 72 together to place the resilient casing under compression. This compression, as in unit 11, is made possible by the molded clearances 73, which are formed as heretofore explained. The cap plate 71 is a part of the tubular body 74 of the coupling bar 57, and the cap plate 72 is formed as a part of a hub 73 to which the driven shaft 14 is made fast by a nut 75.

From the foregoing it will be apparent that a complete flexible coupling having universal joint characteristics has been devised wherein a positive torque drive is obtained with allowance for slip under axially transmitted thrusts. In connection with the universal joint unit attention is directed to the holes 23 which form pockets to receive the material during the molding operation and thus provide not only a plurality of interlinking lugs between the material on opposite sides of the insert but also an interfitting relation with the insert itself. The result is a unitary wall formed of rubber and metal so bonded as to effectively transmit the driving torque and to do so without danger of shearing or breaking down of the material in which the insert is molded. Furthermore, by maintaining the end walls of the unit 11 under compression there is a diminished axial flexibility which is desirable in the main torque transmitting member.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A universal joint construction for a flexible coupling comprising a hollow resilient casing, a universal connection contained within said casing, metal inserts molded into said casing and respectively supporting parts of said universal connection, each insert having portions forming bolt holes, each side of said casing being molded with bolt holes in matched relation with the corresponding insert holes and arranged to form end clearances, supporting plates for opposite sides of said casing, and clamping bolts respectively traversing said holes for forcing the material of said casing into said clearances and maintaining the sides of said casing under compression.

2. A universal joint construction for a flexible coupling comprising a metal insert provided with a plurality of holes therein, a hollow resilient casing having said insert molded in one side thereof with the material of said casing molded into said holes, a universal connection contained within said casing and connecting opposite sides thereof, and supporting plates clamped to said casing.

3. A universal joint construction for a flexible coupling comprising a pair of metal inserts, each insert having a plurality of lugs projecting from one face thereof, a hollow resilient casing having said inserts molded into two opposite side walls thereof respectively with the lugs of one insert interfitting with the lugs of the other insert, a universal connection between said inserts, and supporting plates clamped to said casing.

4. A universal joint construction for a flexible coupling comprising a pair of metal inserts, each insert formed with a plurality of holes therethrough and lugs projecting from one face thereof, a hollow resilient casing having said inserts molded into two opposite side walls thereof respectively with the molded material in said holes and the lugs of one insert interfitting with the lugs of the other insert, a universal connection between said inserts, and supporting plates clamped to said casing.

Signed at Philadelphia, county of Philadelphia, State of Pennsylvania, this 11th day of January, 1927.

ALFRED WEILAND.